F. E. DAVENPORT.
Apparatus for Filling Capsules.

No. 221,534.  Patented Nov. 11, 1879.

WITNESSES:
C. Neveux
C. Sedgwick

INVENTOR:
F. E. Davenport
BY Munn & Co
ATTORNEYS.

UNITED STATES PATENT OFFICE.

FRANKLIN E. DAVENPORT, OF AUBURN, INDIANA.

IMPROVEMENT IN APPARATUS FOR FILLING CAPSULES.

Specification forming part of Letters Patent No. 221,534, dated November 11, 1879; application filed July 16, 1879.

*To all whom it may concern:*

Be it known that I, FRANKLIN E. DAVENPORT, of Auburn, in the county of De Kalb and State of Indiana, have invented a new and Improved Apparatus for Filling Capsules, of which the following is a specification.

The object of my invention is to furnish a simple device or apparatus for use in filling gelatine capsules with medicines, which shall permit the work to be done in an expeditious and cleanly manner.

My invention consists in a funnel, tube, and plunger. The funnel is flattened at one side to assist in taking up the material. The tube is adapted to receive the capsule, and is beveled at its end to aid in placing the same; and the plunger is fitted with an elastic collar, which prevents it from being forced too far into the tube. These features will be described more particularly in connection with the accompanying drawings, wherein—

Figure 1:
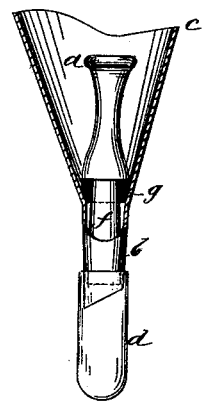
Figure 2:
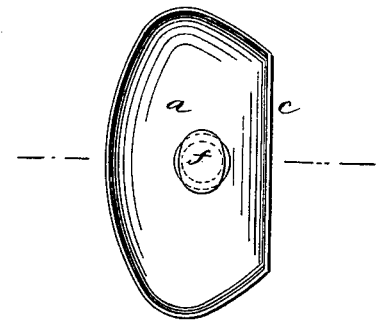

Figure 1 is a sectional elevation of my improved capsule-filler, with a capsule in position for being filled. Fig. 2 is a top view of the apparatus.

Similar letters of reference indicate corresponding parts.

The funnel $a$ and the tube $b$, connected thereto, will preferably be constructed of metal. The funnel is flattened, and on one flattened side, as shown at $c$, the edge is formed straight. This shape permits the powdered material to be readily scraped into the funnel, and the straight edge can be used as a spatula for that purpose.

The outer end of tube $b$ is beveled or cut off at an angle, as shown, which permits the application of the capsule to the tube, as shown at $d$, more readily than when the tube is formed with a square end. The capsule is placed over the end of the tube, so that the drugs inserted into it cannot get upon the outside.

The piston or plunger $f$ is made of suitable material, such as wood or hard rubber. Its upper end is formed of convenient shape for being handled, and the lower end smaller and of a size for entering the tube $b$. Around the piston $f$ is a collar, $g$, of rubber or similar material, which, when the piston is fully pressed down, touches or rests against the sides of the funnel. The elasticity of the collar $g$ permits a slight further movement of the piston to entirely eject the material, and withdraws the piston when pressure is relieved, so that the capsule can be put on the tube without removing the piston.

In use the capsule is first placed on the tube; the straight edge of the funnel is then held in a position for receiving the powder, and the powder scraped into the funnel. The piston is then raised, and after all the powder has passed into the tube, it is forced into the capsule by insertion of the piston, and a slight pressure on its upper end. The capsule is then removed and capped, as usual.

This device is cheap, simple, convenient, and cleanly, and with it the work of filling capsules can be expeditiously accomplished.

Having thus fully described my invention, I claim as new and desire to secure by Letters Patent—

The combination of the funnel $c$, flattened at one side, a tube beveled at the end, and a plunger provided with elastic collar, as and for the purpose specified.

FRANKLIN EDWARDS DAVENPORT.

Witnesses:
JOHN LEONARD DAVIS,
FRED. CHARLES DAVIS.